Dec. 3, 1940. M. E. MITCHELL 2,223,962

AUTOMOBILE PARKING AND STORING UNIT

Filed July 2, 1938 3 Sheets-Sheet 1

INVENTOR.
Malcolm E. Mitchell
BY Joseph B. Gardner
ATTORNEY

Dec. 3, 1940.   M. E. MITCHELL   2,223,962
AUTOMOBILE PARKING AND STORING UNIT
Filed July 2, 1938   3 Sheets-Sheet 2

INVENTOR.
Malcolm E. Mitchell
BY Joseph B. Gardner
ATTORNEY.

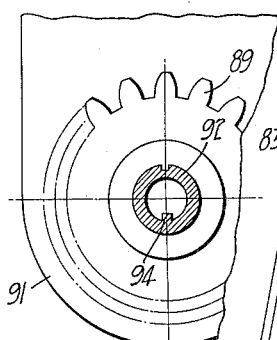
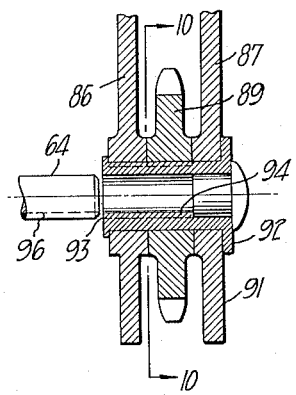
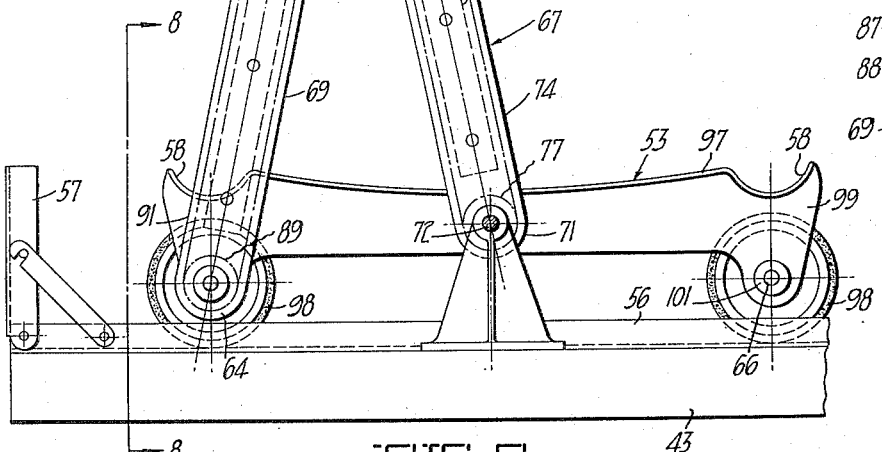
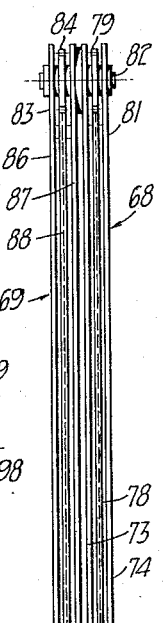

Patented Dec. 3, 1940

2,223,962

UNITED STATES PATENT OFFICE 2,223,962

AUTOMOBILE PARKING AND STORING UNIT

Malcolm E. Mitchell, Oakland, Calif.

Application July 2, 1938, Serial No. 217,268

5 Claims. (Cl. 214—16.1)

The invention relates to building units particularly designed and arranged for parking and storing of automobiles.

An object of the invention is to provide a parking and storing unit of the character described which will afford the housing of a maximum number of automobiles in a minimum space and yet provide for the easy and ready accessibility of the parked automobiles to enable their ready movement into and out of a parked position.

Another object of the invention is to provide a unit of the character above in which the compactness of space and enclosure of the automobiles is afforded without danger to the operator of automobile exhaust gases by the provision of an auxiliary motive means for moving the automobiles in the unit without resorting to the power of the automobile itself.

Another object of the invention is to provide a unit of the character described in which no turning or complicated or involved movement of the automobile is entailed in moving the car into and from its parked position in the unit.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 7 is an enlarged side elevation of the truck and motivating unit therefor shown in substantially the same position as in Figure 5.

Figure 8 is a cross sectional view of the truck taken substantially on the plane of line 8—8 of Figure 7.

Figure 9 is an enlarged cross sectional view of one end of the motivating means for the truck.

Figure 10 is a cross sectional view of the motivating means taken substantially on the plane of line 10—10 of Figure 9.

Figure 1:
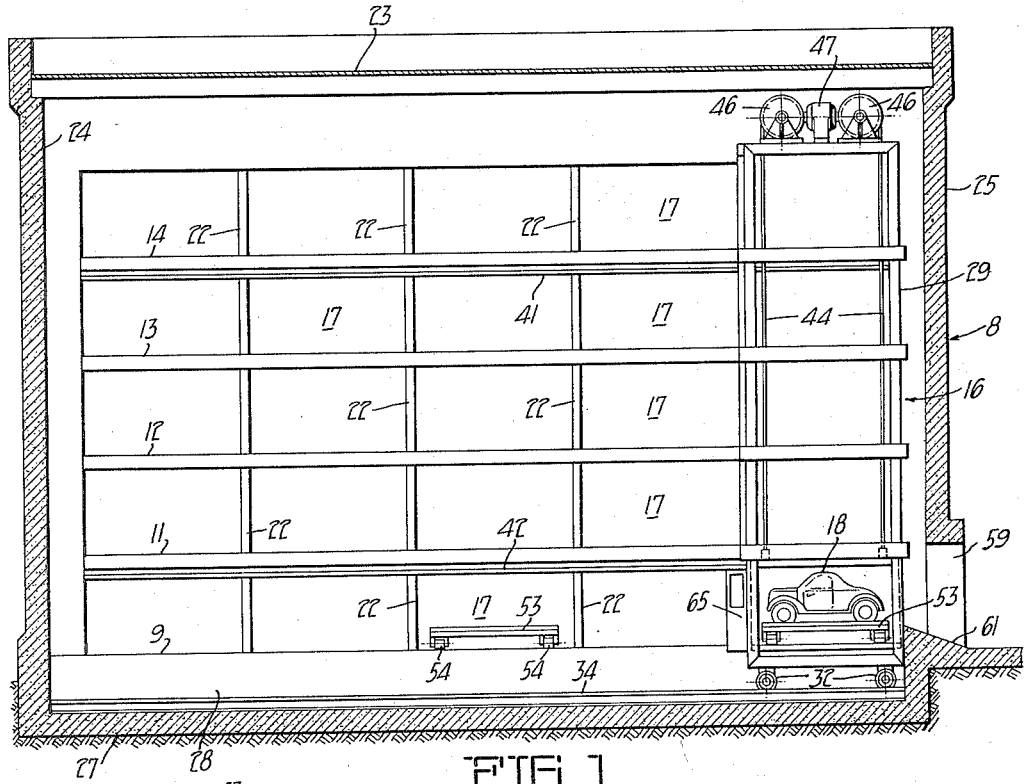
Figure 1 is a vertical sectional view of an automobile parking and storing unit constructed in accordance with the present invention.

The automobile parking and storing unit of the present invention and as illustrated in the accompanying drawings, comprises a building 8 which is composed of a plurality of stories of super-imposed floors 9, 11, 12, 13 and 14, and is constructed with a centrally disposed elongated elevator shaft 16. Provided on each of the floors at opposite sides of the shaft 16 and opening thereto are a plurality of compartments 17 which, as will be clear from Figures 5 and 6, have a transverse width and longitudinal length not substantially larger than the width and length of an automobile 18 to be parked therein. The compartments 17 are in the present construction defined on their outer sides by outside building walls 19 and 21 and longitudinally by wall portions 22 which extend vertically between and support the several floors. The top 23 of the building, particularly over the elevator shaft, is preferably constructed of glass or other translucent material for illuminating the shaft. In addition to the walls above mentioned, the rear wall 24 and front wall 26 complete the building supporting structure. Preferably, formed in the bottom wall 9 and the foundation 27 of the building, is a pit 28 which is arranged vertically under, and substantially coextensive in length and width with the elevator shaft 16.

Mounted in the elevator shaft for longitudinal movement therein is a vertical frame 29 which is substantially coextensive in height with the building and extends from the pit 28 to above the top floor 14 and above the top of the compartments 17 on the top floor. The frame is constructed of a horizontal length somewhat greater than the length of one of the compartments and is constructed of a width but slightly narrower than the width of the elevator shaft between the floors. The frame, as here shown, is mounted on a wheel truck base 31 for movement of the frame longitudinally through the shaft and preferably, the wheels 32 and 33 at the opposite sides of the base are supported on longitudinally extending rails 34 and 36 in the pit 28. Desirably, the wheels are power driven for movement of the frame longitudinally through the shaft and as here shown, a pair of electric motors 37 and 38 are embodied in the truck base and connected to the wheels for this purpose. In addition guide means are preferably provided for maintaining the frame erect and properly guiding its longitudinal movement through the shaft and such means as here shown, consists of a plurality of pairs of guide wheels 39 carried by the frame in vertically spaced relation and which are adapted to engage a plurality of pairs of guide tracks 41 and 42 supported on a plurality of floors at opposite sides of the frame. As here shown, the guide rails 41 and 42 are provided on the second and fifth floors 11 and 14 and the guide wheels 39 are appropriately positioned on the frame for engagement with the rails.

Carried by the frame is an elevator platform 43 which is suspended in the frame by means of cables 44 supported on drums 46 at the top of the frame for movement vertically in the frame into alignment with the several floors. An electric motor 47 mounted at the top of the frame and appropriately geared to the drums 46 provides the motive power for raising and lowering the platform. The platform is preferably constructed as a framed enclosure as particularly illustrated in Figures 1, 5 and 6, to obtain proper rigidity and strength of the platform as well as to maintain the platform in level position in the vertical frame. The vertical frame itself is constructed of substantially open form with vertical corner pieces 48, 49, 51 and 52, leaving the space between these corner pieces, particularly opposite the compartments, open for passage therethrough of an automobile from the platform into the compartments and vice-versa.

Figure 4:
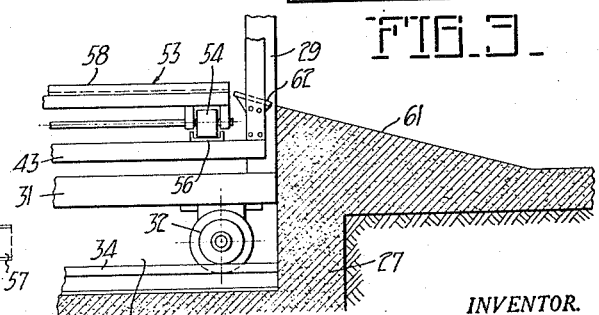
Figure 4 is an enlarged vertical sectional view of the loading platform of the unit.

As a particularly important feature of the present unit I provide a plurality of wheel trucks 53 equal in number to the number of compartments 17 and which are arranged to be supported on the elevator platform for the support of an automobile for ready movement of the automobile from the platform into the compartments and vice-versa. The trucks are provided with a set of wheels 54 which are supported on the elevator platform in a pair of transversely extending channels 56 for proper positioning of the trucks on the platform and to guide the transverse movement of the trucks from the platform into the compartments and vice-versa. To facilitate the transfer of the trucks into and from the compartments, the platform is provided with a pair of hinged channel sections 57 which are mounted in transverse alignment with the channels 56 and are arranged to be lowered onto one of the floors when the platform is raised into alignment therewith for movement of the trucks between the platform and the floor. The automobile 18 is properly positioned on the truck by means of a pair of longitudinally extending guide channels 58 which are arranged to receive the wheels of the automobile. The automobiles may be loaded onto a wheel truck on the platform when the platform is in its lowered position, that is opposite the ground floor 9, and in such position of the platform the automobile may be driven through a receiving and discharge opening 59 in the front wall 26 of the building and over an elevator loading platform 61 (see Figure 4) which rises from the level of the ground floor to approximately the level of the guide rails 58 on the wheel truck. An inclined member 62 carried by the elevator frame approximately connects the loading platform 61 with the guide rails 58 of the truck.

The platform is also provided with a control station 65 for use by the operator of the unit in raising and lowering the platform and in also controlling the longitudinal movement of the frame.

Figure 2:
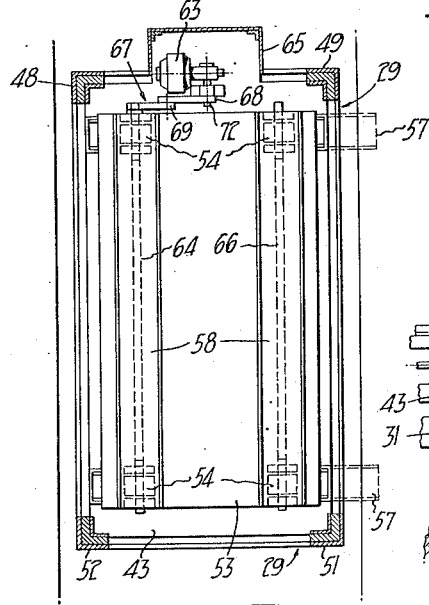
Figure 2 is a horizontal cross sectional view of a vertical movable frame used in the present unit.
Figure 3:
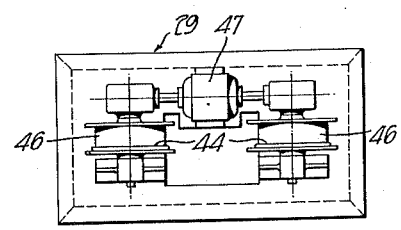
Figure 3 is a plan view of the frame illustrated in Figure 2.
Figure 5:
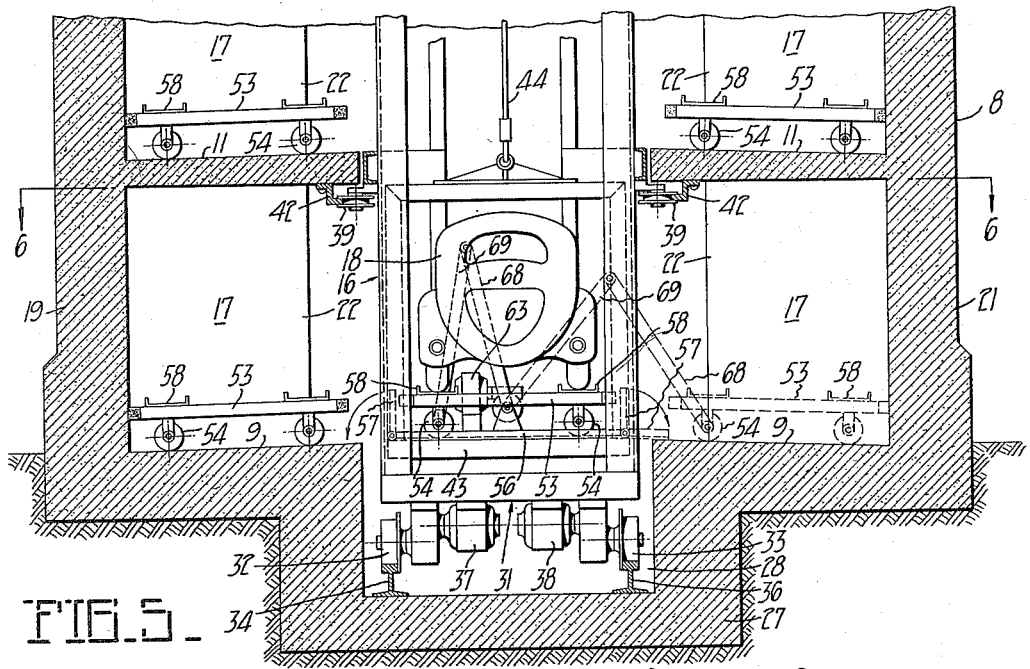
Figure 5 is an enlarged cross sectional view of the unit taken at substantially right angles to Figure 1.
Figure 6:
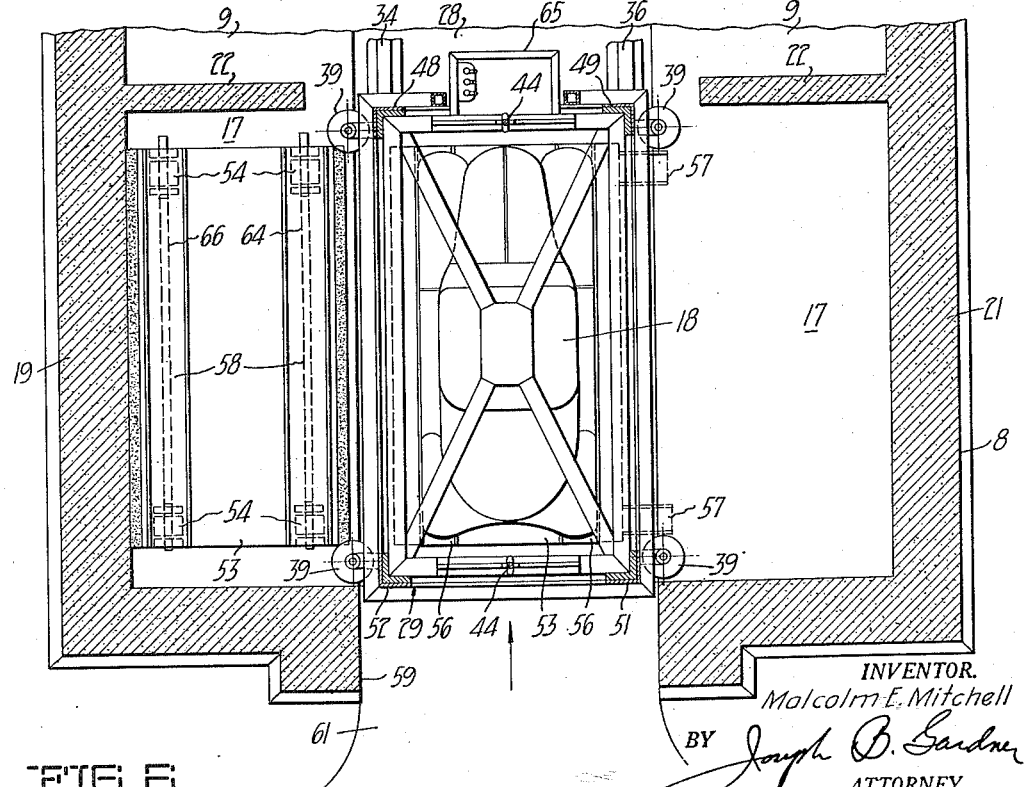
Figure 6 is a horizontal plan cross sectional view of the unit taken substantially on the plane of line 6—6 of Figure 5.

As a further important feature of the present invention, I provide motive means on the platform for moving the wheel trucks 53 onto and from the platform. This means as here shown consists of an electric motor 63 (see Figures 2 and 5) carried by the platform and which is adapted for connection to one of the axles 64 or 66 of the truck by means of a chain drive carried by a flexible linkage 67 including a pair of pivoted link members 68 and 69. The member 68 is pivotally supported adjacent one end 71 to the platform by means of a shaft 72 which is connected to the motor, the member 68 being supported for rotation relative to the shaft so as to afford independent rotation of the shaft and member. The member as seen in Figure 8 consists of a pair of side pieces 73 and 74 which are supported in spaced relation by means of a spacer 76. Mounted on the shaft 72 between the side pieces 73 and 74 is a sprocket wheel 77 which is connected by a chain 78 to a sprocket wheel 79 carried at the opposite end 81 of the member. The sprocket wheel 79 is fixed to a shaft 82 which provides a pivotal connection between the end 81 of the member 68 and an end 83 of the member 69, and a sprocket wheel 84 is mounted between the side pieces 86 and 87 forming the member 69 and on the shaft 82 for rotation with the shaft and the sprocket wheel 79. The sprocket wheel 84 is connected by means of a chain 88 to a sprocket wheel 89 carried at the opposite end 91 of the member 69 on a sleeve 92 journaled in the side pieces 86 and 87. One end 93 of the sleeve is formed for engagement with an end of either of the axles 64 or 66 and preferably, the sleeve is provided with a key 94 for fitting into a keyway 96 in the axles. In this manner power is transmitted directly from the motor shaft 72 to one of the truck axles and the linkage 67 permits lateral movement of the truck in either direction while maintaining the driving connection. Preferably the members 68 and 69 are arranged of a length permitting the members to cross each other in operation; that is, to enable the member 69 to move from one side of the pivot 72 to an opposite side in motivating a truck. In moving a truck from the platform, the linkage end 91 is connected to one of the wheel shafts 64, as indicated in Figures 2, 5 and 7, and the motor energized to cause a rotation of the truck axle and a lateral displacement thereof which is accompanied by a relative movement of the linkage mechanism, as indicated in dotted lines in Figure 5. To draw a truck onto the platform, a reverse operation is effected by first connecting the linkage end 91 to one of the truck shafts and then causing the motor to operate in a reverse direction. In this manner the trucks may be moved onto and from the platform from either side thereof with equal facility, due to the ready connection and disconnection of the linkage end 91 with either of the shaft axles and the control of motor operation in either direction of rotation.

The form of the truck illustrated in Figures 7 and 8 is slightly different than the more diagrammatic showing of the truck in the other figures. The truck as illustrated in Figures 7 and 8 is preferably constructed with the top surface thereof formed with a single sheet 97 of metal or the like having pressed or otherwise formed therein the longitudinal guide channels 58 for the automobile wheels. This top portion of the truck is connected to the truck wheels 98 by means of vertical web portions 99 secured to the under side of the member 97 and provided with bearing portions 101 for receipt of the truck shafts 64 and 66.

The operation of the unit, as will be clear from the foregoing, is substantially as follows: In loading the unit a truck is withdrawn from one of the compartments and placed on the platform and the platform and vertical frame are positioned adjacent the front wall 25 of the building with the platform in lowered position, as illustrated in Figure 1. An automobile is then driven over the loading platform 61 through the opening 59 in the front wall onto the truck on the elevator platform. The frame is then moved bodily longitudinally through the shaft to place the frame in front of the compartment in which the car is to be parked and the platform is then raised into horizontal alignment with the compartment and the car discharged into the compartment as above described. The operator then moves the platform to an empty compartment, withdraws the truck therein onto the platform and returns to starting position for receipt of a second automobile. In unloading the unit the operation is substantially reversed. The operator proceeds with an empty platform to the compartment containing the automobile to be removed and withdraws the automobile and truck from the compartment onto the platform. The operator then moves the platform back to the position indicated in Figure 1 and discharges the automobile through the building opening 59, leaving an empty truck on the platform. This empty truck is returned to the compartment from which the automobile was withdrawn and the operator then proceeds with an empty platform to a second compartment from which an automobile is to be withdrawn.

I claim:

1. An automobile parking and storing unit comprising, a building having a plurality of stories of superimposed floors and constructed to provide an elongated centrally disposed vertical shaft and a plurality of horizontally spaced compartments on each of said floors at opposite sides of and opening to said shaft, a vertical frame substantially coextensive in height with said floors and mounted in said shaft for horizontal movement therein, an elevator platform carried by said frame, means for displacing said platform vertically into alignment with said floors, and a plurality of trucks equal in number to the number of said compartments, wheels and axles on said trucks for support thereof on said platform and for movement from said platform into one of said compartments and vice-versa, power drive means on said platform and adapted for attachment to said axles on said trucks to rotate said wheels to cause said last named movement, said platform having its greatest length disposed longitudinally in said shaft and provided with transversely extending channels for support of said trucks, said trucks having a length approximately equal to but shorter than said platform and provided with longitudinal channels for support of the wheels of an automobile, said platform being of a length sufficient to support the automobile and being of approximately the same but shorter length than said compartments, said frame having opposed open sides at said floors opening to said compartments for passing of one of said trucks and an automobile thereon through said frame from said platform into one of said compartments and vice-versa.

2. An automobile parking and storing unit comprising, a building having a plurality of stories of superimposed floors and constructed to provide an elongated centrally disposed vertical shaft and a plurality of horizontally spaced compartments on each of said floors at opposite sides of and opening to said shaft, a vertical frame substantially coextensive in height with said floors and mounted in said shaft for horizontal movement therein, an elevator platform carried by said frame, means for displacing said platform vertically into alignment with said floors, a plurality of trucks equal in number to the number of said compartments, wheels and axles on said trucks for support thereof, and a drive means on said platform and formed for attachment to one of said axles on said trucks and adapted to transmit power to said wheels for movement on either side of or across said platform from points spaced from said platform, said platform having its greatest length disposed longitudinally in said shaft and provided with transversely extending channels for support of said trucks, said trucks having a length approximately equal to but shorter than said platform and provided with longitudinal channels for support of the wheels of an automobile, said platform being of a length sufficient to support the automobile and being of approximately the same but shorter length than said compartments, said frame having opposed open sides at said floors opening to said compartments for passing of one of said trucks and an automobile thereon through said frame from said platform into one of said compartments and vice-versa, and motor driven means carried by said platform for moving said trucks from said platform into said compartments and vice-versa.

3. An automobile parking and storing unit comprising, a building having a plurality of stories of superimposed floors and constructed to provide an elongated centrally disposed vertical shaft and a plurality of horizontally spaced compartments on each of said floors at opposite sides of and opening to said shaft, a vertical frame substantially coextensive in height with said floors and mounted in said shaft for horizontal movement therein, an elevator platform carried by said frame, means for displacing said platform vertically into alignment with said floors, tracks mounted transversely of said platform and corresponding tracks in said compartments, a plurality of trucks equal in number to the number of said compartments, axles and wheels for supporting said trucks on said tracks, said trucks being adapted for support of an automobile and for movement from said platform into one of said compartments and vice-versa, said platform having its greatest length disposed longitudinally in said shaft and provided with transversely extending channels for support of said trucks, said trucks having a length approximately equal to but shorter than said platform and provided with longitudinal channels for support of the wheels of an automobile, said platform being of a length sufficient to support the automobile and being of approximately the same but shorter length than said compartments, said frame having opposed open sides at said floors opening to said compartments for passing of one of said trucks and an automobile thereon through said frame from said platform into one of said compartments and vice-versa, an electric motor carried by said platform, and flexible linkage drive means connected to said motor and adapted for detachable connection to the outer end of an axle on said trucks for rotating said wheels and moving said trucks from said platform into said compartments and vice-versa, said flexible linkage being adapted to be connected to said truck axle when said truck is on said platform or spaced a substantial distance on either side of said platform.

4. An automobile parking and storing unit comprising, a building constructed to provide a plurality of compartments for parking of automobiles and provided with passage means into the building for automobiles, a platform in said building movable from said passage means to each of said compartments, a plurality of wheel supporting and guiding means on said platform, a plurality of trucks each having axles and wheels engageable in said last named means and being adapted for carrying by said platform for movement into and from said compartments and being adapted to support an automobile, motor driven means carried by said platform, chain and sprocket means connected to said platform and adapted for detachable connection to said axles for rotating said wheels for moving said trucks from said platform into said compartments and vice-versa.

5. An automobile parking and storing unit comprising, a building constructed to provide a plurality of compartments for parking of automobiles and provided with passage means into the building for automobiles, a movable platform in said building, means for moving said platform from said passage means to each of said compartments, a plurality of roll-about trucks each being adapted for support of an automobile and for carrying by said platform for movement from said platform to said compartments and vice-versa, said trucks being provided with wheels and supporting axles therefor, an electric motor carried by said platform, a flexible linkage carried by said platform and adapted for connection to one of the truck axles, and a chain and sprocket drive means supported by said linkage and connected to said motor for driving said trucks to and from said platform and compartments.

MALCOLM E. MITCHELL.